(12) United States Patent
Assa et al.

(10) Patent No.: US 6,829,000 B2
(45) Date of Patent: Dec. 7, 2004

(54) PRINTING A CODE ON A PRODUCT

(75) Inventors: Shlomo Assa, San Diego, CA (US);
Steven Jerome Meyer, San Diego, CA (US); Jeffrey Allen Rideout, San Diego, CA (US)

(73) Assignee: LaserInk, San Diego, CA (US)

( * ) Notice: Subject to any disclaimer, the term of this patent is extended or adjusted under 35 U.S.C. 154(b) by 0 days.

(21) Appl. No.: 10/712,409

(22) Filed: Nov. 13, 2003

(65) Prior Publication Data

US 2004/0141052 A1 Jul. 22, 2004

Related U.S. Application Data

(63) Continuation of application No. 09/705,206, filed on Nov. 2, 2000, now abandoned.
(60) Provisional application No. 60/197,518, filed on Apr. 18, 2000.

(51) Int. Cl.[7] .............................. B41J 15/14; B41J 27/00
(52) U.S. Cl. ........................................ 347/257; 347/242
(58) Field of Search ................................ 347/241, 242, 347/245, 256, 257, 263, 224, 225; 219/121.74, 121.75, 121.79, 121.85, 121.6, 121.68, 121.7, 121.76

(56) References Cited

U.S. PATENT DOCUMENTS

| | | | |
|---|---|---|---|
| 3,571,554 A | 3/1971 | Baujoin | 219/121.75 |
| 3,648,601 A | 3/1972 | Weidman | 101/35 |
| 3,714,393 A | 1/1973 | Johnson et al. | 377/24 |
| 3,725,655 A | 4/1973 | Edstrom et al. | 702/158 |
| 3,761,675 A | 9/1973 | Mason et al. | 219/121.67 |
| 3,803,637 A | 4/1974 | Martin et al. | 347/256 |
| 3,824,015 A | 7/1974 | Petit et al. | 356/28 |

(List continued on next page.)

FOREIGN PATENT DOCUMENTS

| | | |
|---|---|---|
| DE | 400476 | 4/1922 |
| DE | 243 798 A1 | 11/1987 |
| EP | 0 141 724 B1 | 5/1985 |
| EP | 0 168 351 A1 | 1/1986 |
| EP | 0 168 351 B1 | 1/1986 |
| EP | 0 176 872 A1 | 4/1986 |
| EP | 0 215 389 B1 | 3/1987 |

(List continued on next page.)

OTHER PUBLICATIONS

Allen, L. "Automatic Identification: How Do You Choose It, & Where Do You Use It?", *Automation*, Jul., 1991.
Dambrot, S. "Applications Drive Japan's Laser Industry", *Photonics*, Jul., 1992.
Inglesby, T. "Printers on the Floor and in the Bars", *Manufacturing Systems*, Feb., 1992.
Kirkland, C. "Hydraulic Pumps: Fixed vs. Variable Volume", *Plastics World*, Oct., 1991.
LaCosse, D. "Manufacturing Begins With Product Marketing", *Automation*, Sep., 1988.
Lang, N. "Packaging Parade", *Beverage World*, Jan., 1991.
Makadok, S. "Production Realities: Faster, Smarter a Must", *Beverage Industry*, vol. 83, No. 12, Dec., 1992.

(List continued on next page.)

*Primary Examiner*—Hai Pham
(74) *Attorney, Agent, or Firm*—Fish & Richardson P.C.

(57) ABSTRACT

A printing system is disclosed. The system includes a laser configured to produce a printing beam for printing a code on a product, the laser being at most a 25 Watt laser and a housing including a printing beam exit member through which the printing beam exits the housing. The system also includes an optics assembly within the housing. The optics assembly focuses the printing beam on a product which is adjacent to the housing.

15 Claims, 14 Drawing Sheets

U.S. PATENT DOCUMENTS

| | | | | |
|---|---|---|---|---|
| 3,848,104 | A | 11/1974 | Locke | 219/121.65 |
| 3,863,565 | A | 2/1975 | Patykula | 101/44 |
| 3,885,873 | A | 5/1975 | Andermo | 356/28 |
| 3,898,417 | A | 8/1975 | Atkinson | 219/121.61 |
| 3,975,261 | A | 8/1976 | Beck | 209/565 |
| 4,011,437 | A | 3/1977 | Hohn | 318/568.23 |
| 4,024,545 | A | 5/1977 | Dowling et al. | 347/259 |
| 4,025,752 | A | 5/1977 | Whitman, III | 219/384 |
| 4,049,945 | A | 9/1977 | Ehlscheid et al. | 219/121.67 |
| 4,063,064 | A | 12/1977 | Saunders et al. | 219/121.7 |
| 4,065,212 | A | 12/1977 | Belleson et al. | 356/398 |
| 4,083,053 | A | 4/1978 | Ouchi et al. | 347/4 |
| 4,086,522 | A | 4/1978 | Engelberger et al. | 318/568.13 |
| 4,088,864 | A | 5/1978 | Theeuwes et al. | 219/121.71 |
| 4,099,830 | A | 7/1978 | Whittle et al. | 359/217 |
| 4,100,599 | A | 7/1978 | Nally | 702/149 |
| 4,106,965 | A | 8/1978 | Lee | 156/123 |
| 4,154,530 | A | 5/1979 | Connolly, Jr. et al. | 356/139.05 |
| 4,160,894 | A | 7/1979 | Stemmler et al. | 219/121.67 |
| 4,207,985 | A | 6/1980 | Lockett et al. | 209/564 |
| 4,218,606 | A | 8/1980 | Whitman, III | 219/121.6 |
| 4,240,017 | A | 12/1980 | Uekusa | 318/600 |
| 4,271,968 | A | 6/1981 | Mehrkam et al. | 209/564 |
| 4,283,145 | A | 8/1981 | Miyazawa | 356/364 |
| 4,285,012 | A | 8/1981 | Ohara et al. | 358/496 |
| 4,297,559 | A | 10/1981 | Whitman, III | 219/121.52 |
| 4,307,282 | A | 12/1981 | Gappa | 219/121.69 |
| 4,319,122 | A | 3/1982 | Pope et al. | 219/121.63 |
| 4,323,755 | A | 4/1982 | Nierenberg | 219/121.69 |
| 4,334,471 | A | 6/1982 | Noyes et al. | 101/228 |
| 4,338,114 | A | 7/1982 | Brockway et al. | 65/28 |
| 4,338,147 | A | 7/1982 | Backstrom et al. | 156/187 |
| 4,354,196 | A | 10/1982 | Neumann et al. | 347/248 |
| 4,371,782 | A | 2/1983 | Brouwer | 250/202 |
| 4,375,025 | A | 2/1983 | Carlson | 219/121.68 |
| 4,404,454 | A | 9/1983 | Taylor et al. | 219/121.7 |
| 4,468,551 | A | 8/1984 | Neiheisel | 219/121.6 |
| 4,480,169 | A | 10/1984 | Macken | 219/121.68 |
| 4,497,995 | A | 2/1985 | Nilsen | 219/121.63 |
| 4,517,436 | A | 5/1985 | Lawrence | 219/121.68 |
| 4,557,386 | A | 12/1985 | Buckley et al. | 209/556 |
| 4,560,856 | A | 12/1985 | Miller et al. | 219/121.68 |
| 4,564,739 | A | 1/1986 | Mattelin | 219/121.68 |
| 4,576,286 | A | 3/1986 | Buckley et al. | 209/558 |
| 4,578,329 | A | 3/1986 | Holsappel | 430/18 |
| 4,584,455 | A | 4/1986 | Tomizawa | 219/121.68 |
| 4,587,396 | A | 5/1986 | Rubin | 219/121.78 |
| 4,590,859 | A | 5/1986 | Pou et al. | 121/484 |
| 4,618,759 | A | 10/1986 | Muller et al. | 219/121.75 |
| 4,626,649 | A | 12/1986 | Dupeyrat | 219/121.78 |
| 4,626,656 | A | 12/1986 | Ootsuka et al. | 219/121.68 |
| 4,636,043 | A * | 1/1987 | Bellar | 359/223 |
| 4,638,144 | A | 1/1987 | Latta, Jr. | 219/121.68 |
| 4,652,722 | A | 3/1987 | Stone et al. | 219/121.76 |
| 4,675,498 | A | 6/1987 | Lemelson | 219/121.62 |
| 4,695,698 | A | 9/1987 | Mayor et al. | 219/121.6 |
| 4,696,143 | A | 9/1987 | Young | 53/289 |
| 4,703,166 | A | 10/1987 | Bruning | 250/203.1 |
| 4,707,596 | A * | 11/1987 | Hohberg | 250/201.8 |
| 4,707,709 | A | 11/1987 | Tsilibes | 347/255 |
| 4,720,618 | A | 1/1988 | Stamer et al. | 219/121.61 |
| 4,725,709 | A | 2/1988 | Mattelin | 219/121.8 |
| 4,727,235 | A | 2/1988 | Stamer et al. | 219/121.68 |
| 4,736,187 | A | 4/1988 | Kibrick et al. | 341/3 |
| 4,742,206 | A | 5/1988 | Dietterich et al. | 219/121.67 |
| 4,758,703 | A | 7/1988 | Drever et al. | 219/121.68 |
| 4,769,310 | A | 9/1988 | Gugger et al. | 430/346 |
| 4,791,267 | A | 12/1988 | Yokoyama et al. | 219/121.69 |
| 4,797,532 | A * | 1/1989 | Maiorov | 219/121.74 |
| 4,799,215 | A | 1/1989 | Suzuki | 370/227 |
| 4,803,336 | A | 2/1989 | Myer | 219/121.68 |
| 4,806,727 | A | 2/1989 | Ruckl | 219/121.68 |
| 4,808,790 | A | 2/1989 | Ruckl | 219/121.68 |
| 4,822,973 | A | 4/1989 | Fahner et al. | 219/121.6 |
| 4,852,020 | A | 7/1989 | Morita | 345/441 |
| 4,854,696 | A | 8/1989 | Guez | 352/90 |
| 4,861,620 | A | 8/1989 | Azuma et al. | 427/556 |
| 4,870,623 | A | 9/1989 | Buckley et al. | 367/7 |
| 4,874,919 | A | 10/1989 | Bransden et al. | 219/121.68 |
| 4,901,073 | A | 2/1990 | Kibrick | 341/13 |
| 4,906,813 | A | 3/1990 | Gajdos | 219/121.68 |
| 4,914,437 | A | 4/1990 | Kibrick et al. | 341/3 |
| 4,918,284 | A | 4/1990 | Weisz | 219/121.78 |
| 4,941,082 | A | 7/1990 | Pailthorp et al. | 700/57 |
| 4,952,789 | A | 8/1990 | Suttie | 219/121.68 |
| 4,956,539 | A | 9/1990 | Uesugi et al. | 219/121.8 |
| 4,965,829 | A | 10/1990 | Lemelson | 382/101 |
| 4,969,134 | A | 11/1990 | Balderson | 368/239 |
| 4,970,366 | A | 11/1990 | Imatou et al. | 219/121.69 |
| 4,970,600 | A | 11/1990 | Garnier et al. | 219/121.68 |
| 4,987,287 | A | 1/1991 | Jack | 219/121.69 |
| 5,021,631 | A | 6/1991 | Ravellat | 219/121.68 |
| 5,041,716 | A | 8/1991 | Wakabayashi | 219/121.68 |
| 5,049,721 | A | 9/1991 | Parnas et al. | 219/121.68 |
| 5,051,558 | A | 9/1991 | Sukhman | 219/121.68 |
| 5,087,805 | A | 2/1992 | Silverschotz et al. | 219/121.71 |
| 5,109,149 | A | 4/1992 | Leung | 219/121.69 |
| 5,120,928 | A | 6/1992 | Piliero | 219/121.68 |
| 5,132,510 | A | 7/1992 | Klingel et al. | 219/121.82 |
| 5,166,505 | A | 11/1992 | Gorriz et al. | 250/201.7 |
| 5,168,454 | A | 12/1992 | LaPlante et al. | 700/166 |
| 5,170,279 | A | 12/1992 | Schwartz et al. | 359/217 |
| 5,175,425 | A | 12/1992 | Spratte et al. | 235/494 |
| 5,206,496 | A | 4/1993 | Clement et al. | 250/271 |
| 5,229,573 | A | 7/1993 | Stone et al. | 219/121.68 |
| 5,229,574 | A | 7/1993 | Stone | 219/121.68 |
| 5,262,613 | A * | 11/1993 | Norris et al. | 219/121.68 |
| 5,283,773 | A | 2/1994 | Thomas et al. | 369/44.26 |
| 5,327,529 | A | 7/1994 | Fults et al. | 345/762 |
| 5,329,090 | A | 7/1994 | Woelki et al. | 219/121.68 |
| 5,367,152 | A * | 11/1994 | Krichever et al. | 235/462.47 |
| 5,375,722 | A | 12/1994 | Leary et al. | 209/578 |
| 5,401,960 | A | 3/1995 | Fisun et al. | 250/271 |
| 5,515,480 | A | 5/1996 | Frazier | 358/1.9 |
| 5,653,900 | A | 8/1997 | Clement et al. | 219/121.68 |
| 5,680,384 | A * | 10/1997 | Seki et al. | 369/112.29 |
| 5,734,412 | A | 3/1998 | Hasebe et al. | 347/247 |
| 5,751,436 | A | 5/1998 | Kwon et al. | 219/121.68 |
| 5,906,609 | A | 5/1999 | Assa et al. | 606/9 |
| 5,938,657 | A | 8/1999 | Assa et al. | 606/9 |
| 5,966,457 | A | 10/1999 | Lemelson | 382/141 |
| 5,990,444 | A | 11/1999 | Gostin | 219/121.69 |
| 6,049,055 | A | 4/2000 | Fannash et al. | 219/121.66 |
| 6,061,081 | A | 5/2000 | Hasebe et al. | 347/247 |
| 6,121,067 | A | 9/2000 | Canella | 438/26 |
| 6,121,574 | A * | 9/2000 | Xu | 219/121.69 |
| 6,160,835 | A | 12/2000 | Kwon | 372/108 |
| 6,433,303 | B1 * | 8/2002 | Liu et al. | 219/121.7 |
| 6,518,540 | B1 | 2/2003 | Wee et al. | 219/121.61 |

FOREIGN PATENT DOCUMENTS

| | | |
|---|---|---|
| EP | 0 233 146 A1 | 8/1987 |
| EP | 0 233 146 B1 | 8/1987 |
| EP | 0 244 574 A1 | 11/1987 |
| EP | 0 262 225 A1 | 4/1988 |
| EP | 0 276 995 B1 | 8/1988 |
| EP | 0 316 347 B1 | 5/1989 |
| EP | 0 391 539 A2 | 10/1990 |
| EP | 0 391 540 A2 | 10/1990 |
| EP | 0 400 476 A2 | 12/1990 |
| EP | 0 419 377 A1 | 3/1991 |

| | | | |
|---|---|---|---|
| EP | 0 420 198 B1 | 4/1991 | |
| EP | 0 446 482 A1 | 9/1991 | |
| EP | 0 446 887 A1 | 9/1991 | |
| EP | 0 453 733 A1 | 10/1991 | |
| EP | 0 464 270 A1 | 1/1992 | |
| EP | 0 495 647 B1 | 7/1992 | |
| EP | 0 516 199 A1 | 12/1992 | |
| EP | 0 519 391 A1 | 12/1992 | |
| EP | 0 531 565 A1 | 3/1993 | |
| EP | 0 531 584 A1 | 3/1993 | |
| EP | 0 402 298 B1 | 7/1993 | |
| EP | 0 729 806 A1 | 9/1996 | |
| EP | 0 729 906 B1 | 6/2000 | |
| ES | 2 013 193 | 4/1990 | |
| FR | 2 271 683 | * 12/1975 | ............. H01S/3/00 |
| FR | 227 1683 A | * 1/1976 | ............. B23P/1/00 |
| FR | 2 450 455 | 9/1980 | |
| GB | 1 360 380 | 7/1974 | |
| GB | 1 450 251 | 9/1976 | |
| GB | 1 467 152 | 3/1977 | |
| GB | 1 541 214 | 2/1979 | |
| GB | 2 059 354 A | 4/1981 | |
| GB | 2 073 639 A | 10/1981 | |
| GB | 2 078 621 A | 1/1982 | |
| GB | 2 126 955 A | 4/1984 | |
| GB | 2 131 417 A | 6/1984 | |
| GB | 2 133 180 A | 7/1984 | |
| GB | 2 133 352 A | 7/1984 | |
| GB | 2 157 851 A | 10/1985 | |
| GB | 2 169 282 A | 7/1986 | |
| GB | 2 229 389 A | 9/1990 | |
| GB | 2 247 677 A | 3/1992 | |
| GB | 2 252 068 A | 7/1992 | |
| GB | 2 253 282 A | 9/1992 | |
| JP | 5229740 | 3/1977 | |
| JP | 5511824 | 1/1980 | |
| JP | 5714981 | 1/1982 | |
| JP | 5781984 | 5/1982 | |
| JP | 5796865 | 6/1982 | |
| JP | 5942194 | 3/1984 | |
| JP | 5945091 | 3/1984 | |
| JP | 5973191 | 5/1984 | |
| JP | 59207246 | 11/1984 | |
| JP | 60106686 | 6/1985 | |
| JP | 60227994 | 11/1985 | |
| JP | 63248589 | 10/1988 | |
| JP | 63174314 | 11/1988 | |
| JP | 2863872 | 12/1988 | |
| JP | 6411083 | 1/1989 | |
| JP | 1166893 | 6/1989 | |
| JP | 215887 | 1/1990 | |
| JP | 2187288 | 7/1990 | |
| JP | 2187289 | 7/1990 | |
| JP | 2217186 | 8/1990 | |
| JP | 376677 | 4/1991 | |
| JP | 5169286 | 7/1993 | |
| WO | WO 81/01889 | 7/1981 | |
| WO | WO 82/00635 | 3/1982 | |
| WO | WO 85/00123 | 1/1985 | |
| WO | WO 86/04549 | 8/1986 | |
| WO | WO 89/01385 | 2/1989 | |
| WO | WO 90/00459 | 1/1990 | |
| WO | WO 90/04223 | 4/1990 | |
| WO | WO 91/04828 | 4/1991 | |
| WO | WO 91/12923 | 5/1991 | |
| WO | WO 92/04155 | 3/1992 | |
| WO | WO 92/09399 | 6/1992 | |
| WO | WO 92/12820 | 8/1992 | |
| WO | WO 93/15029 | 8/1993 | |

OTHER PUBLICATIONS

Mark, "Lasers Help Capacitor Maker Gain Good Marks", *Production Engineering*, Jul., 1983.

Mikami, T. et al. "A Correction Method for Laser Scanning Errors in High Speed Laser Printers", *Fujitsu*, vol. 18, No. 4, 1982.

Redmond, B. "Demand Calls the Tune", *Materials Handling News*, Jul., 1985.

Samuels, M. "PLC and PC Join to Automate Laser Assembly", *Production Engineering*, Mar., 1987.

Seideman, T. "BC Labels Turn High–Tech", http://web4.infotrac.galegroup.com, vol.92, No.1, p. 83(2), Jan., 1993.

"ProLase for Window's 95 Features", http://laserware.com/95Features.html, retrieved Oct. 6, 2000.

"CLC ControlLaser Corporation", printout Mar. 6, 2000.

"Industrial Dynamics Offers the Lasetec Laser Printer for Higher Quality Product Information and Codes at High Speeds on Bottles, Cans, Packages", http://www.filtec.com/newpage1.htm, 1999–2000, retrieved Oct. 6, 2000.

"Overview of WinLaseNT™Marker Suite", http://www.alase.com/software/software.html, retrieved Oct. 6, 2000.

"SCAN jet", http://www.scanlab.de/jetmain.html, retrieved Oct. 6, 2000.

"*SCAN* jet—more information", http://www.scanlab.de/jetmain2.html, retrieved Oct. 6, 2000.

Markem Patent Prior Art Search, SFP Oct. 16, 2000.

"LaserPro DM Laser Coding System", http://www.marconidata.com/products/prod_laserpro_dm.html, 1997–2000, retrieved Oct. 7, 2000.

"Videojet Announces New Position in Laser Coding Market", Press Release, http://www.marconidata.com/press/laser_pr.html, 1997–1999, retrieved Oct. 7, 2000.

MIKOH Corporation Limited, http://www.mikoh.com/index.html, retrieved Oct. 6, 2000.

"Beam–Steered Laser Marking on Parts in Motion", http://www.semiconductorfabtech.com/features/tap_old/articles/06.427.html, retrieved Oct. 6, 2000.

"Laser Systems—Medical Device Manufacturing", http://www.gsilumonics.com/markets%5Fframe/medical/marking.htm, GSI Lumonics 2000, retrieved Oct. 6, 2000.

Front Range Laser, http://www.frontrangelaser.net/products.htm, Jun. 9, 2000, retrieved Oct. 7, 2000.

Laser Technology Centre company description, http://www.hi–laser.com/eng/about/about.htm, 2000, retrieved Oct. 7, 2000.

BetaMark–2000 product description, http://www.hi–laser.com/eng/equipment/betamark2000.htm, retrieved Oct. 7, 2000.

Solaris Laser S.A., http://www.solarislaser.com.pl/index.htm, retrieved Oct. 7, 2000.

"Coming soon! The FH–Series "Tracker", Marking Head", http://www.winmarkpro.com/Press Releases/Tracker.htm, Mar. 2000, retrieved Oct. 6, 2000.

"FH–Series Marking Head", http://www.winmarkpro.com/Products/marking.htm, retrieved Oct. 6, 2000.

FH Series Marking Head, Marking Specifications, http://www.winmarkpro.com/Products/FHSpecs.html, retrieved Oct. 6, 2000.

"SolarJet: Laser Marking 'On the Fly' System for High Speed Package Coding", http://www.wlsc.com/solarjet.htm, retrieved Oct. 7, 2000.

Industrial Laser Source, "Software for High Speed Galvonometer/Scanner for Marking or Cutting on the Fly", http://www.lasertubes.com/software.htm, retrieved Oct. 7, 2000.

Markem Patent Prior Art Search, Non–patent Literature References.

Spencer, J. "Labeling & Marking", *Handling and Shipping Management*, Jan., 1983.

Stovicek, D. "No Longer Science Fiction, Lasers are Now a Part of Every Day Life in Industry", *Automation*, Aug., 1989.

"What's Ahead in Marking and Labeling", *Modern Materials Handling*, Oct., 1985.

\* cited by examiner

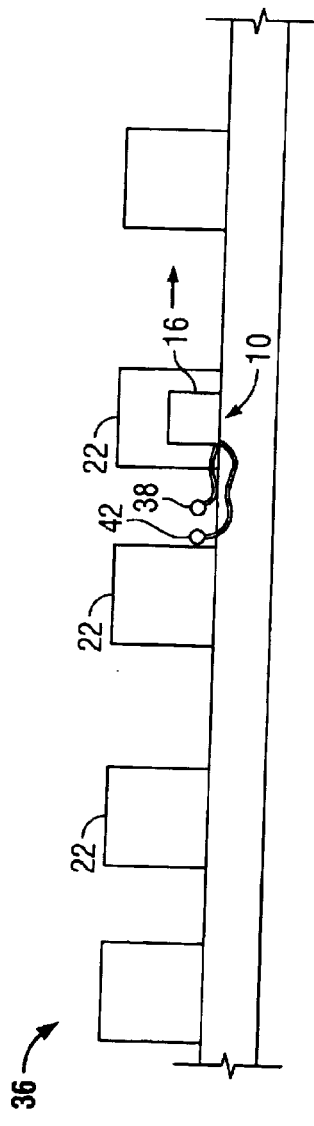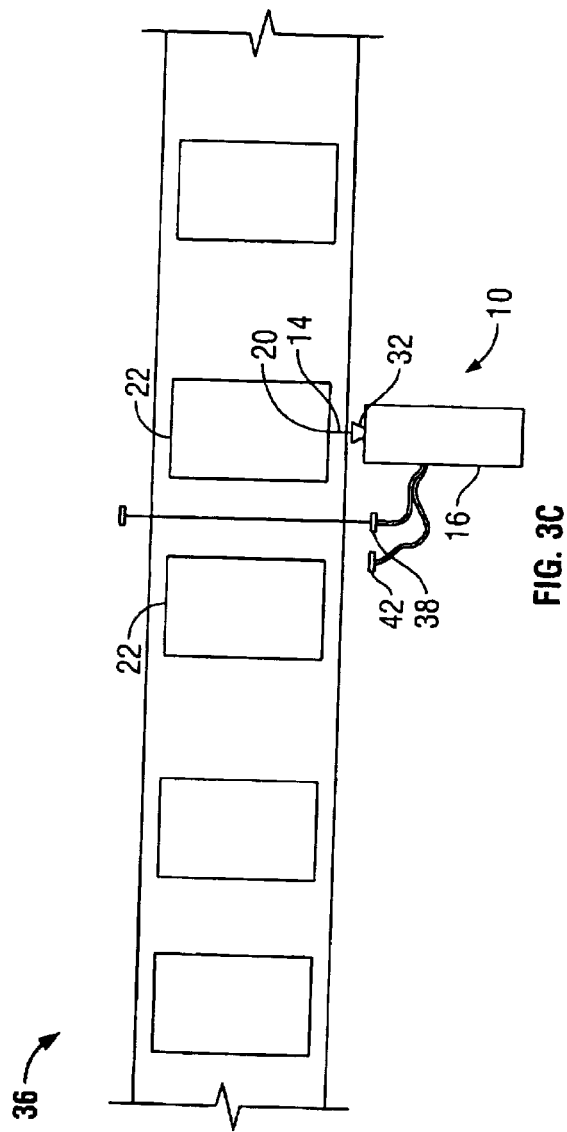

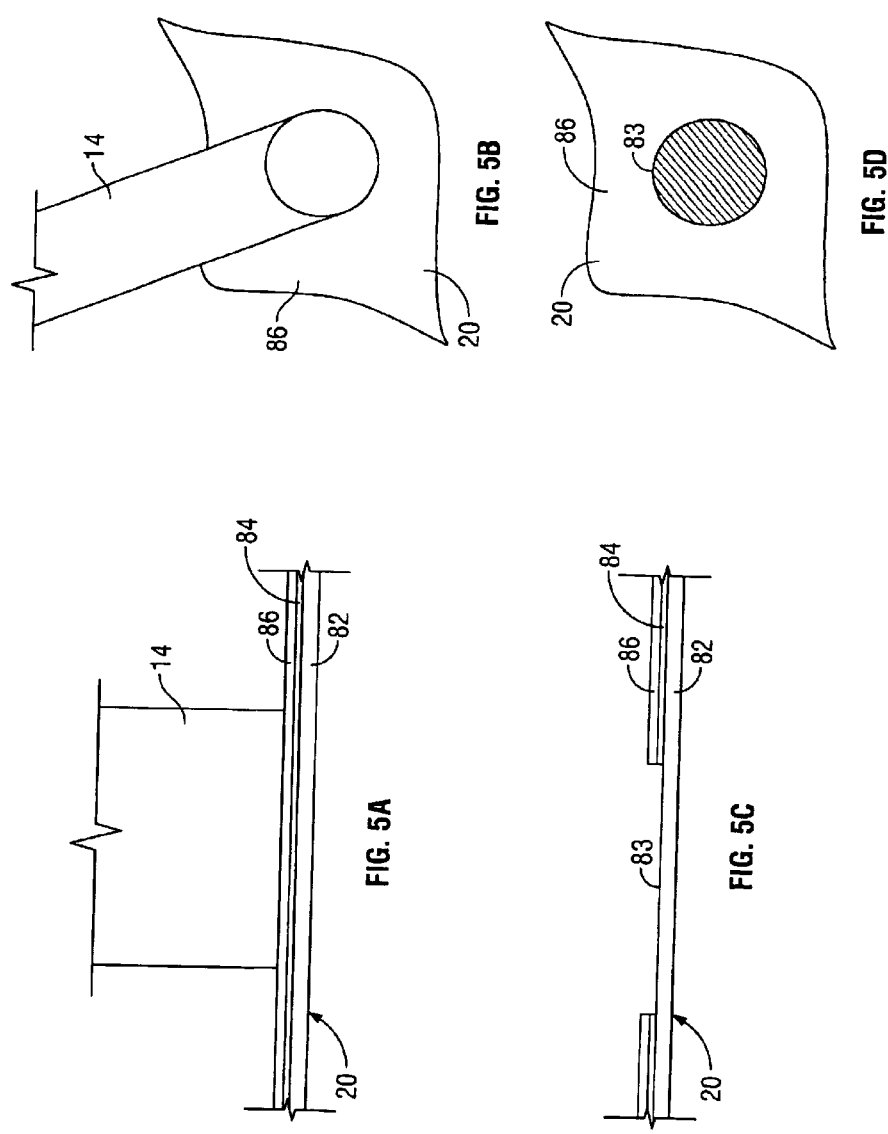

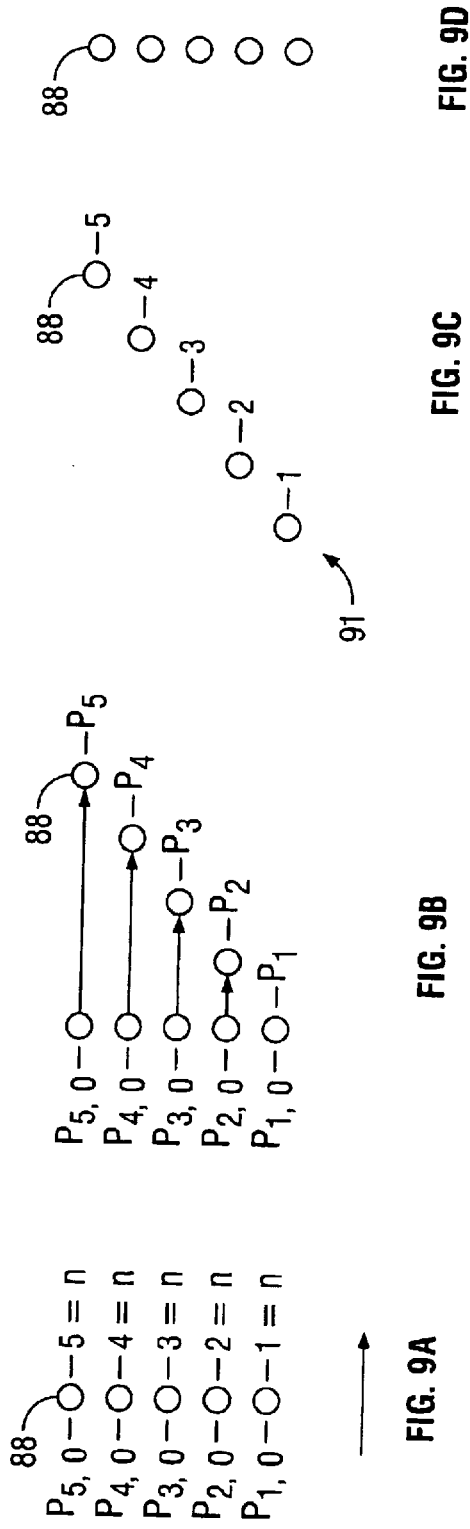

IMAGE
|←d4→|

PRINTING A CODE ON A PRODUCT

RELATED APPLICATIONS

This application is a continuation application of and claims priority to U.S. application Ser. No. 09/705,206, filed on Nov. 2, 2000 now abandoned. This application further claims the benefit of U.S. Provisional Application No. 60/197,518, filed Apr. 18, 2000 and entitled "PRINTING A CODE ON A PRODUCT," which is incorporated herein in its entirety.

This patent application is related to U.S. patent applications entitled "PRINTING A CODE ON A PRODUCT" 09/704,653 and "PRINTING A CODE ON A PRODUCT", Ser. No. 09/705,007, both filed concurrently herewith. Both related patent applications are incorporated by reference herein.

BACKGROUND

1. Field of the Invention

The invention relates generally to a printing system. In particular, the invention relates to a printing system having a laser for printing on a product positioned adjacent to the printing system.

2. Background of the Invention

Modern production practices often require that a code be printed on a commercially available product. These codes are easily observed on common products such as soda cans, cosmetics pet food container etc. Additionally, government regulatory agencies, such as the Food and Drug Administration may require certain products to have these codes.

These codes often include information which is unique to the time and place that the product is manufactured. For instance, many code communicate a batch number associated with a product. Many codes go further and indicate the actual time and date of manufacture. Since these codes are unique to the actual manufacturing parameters, the code can not be pre-printed on the label for the product. Hence, the code must often be printed on the label after the product is manufactured.

Current code printing technology employs ink jets which spray ink onto the label. In order to prevent difficulties associated with having a wet code printed on the label, these ink jets often use quick drying ink which is known to dry in the nozzle. As a result, these ink jets can cause considerable down time. Further, the manufacturer must continue to buy the ink long after purchasing the ink jet. As a result, the ink jet becomes an ongoing manufacturing expense. Additionally, the toxicity of some ink adds additional manufacturing complexity. For the above reasons there is a desire to replace code printing ink jets with an improved technology.

SUMMARY OF THE INVENTION

The invention relates to a method for printing on a material. The method includes providing a printing system having a laser source for producing a printing beam and directing the printing beam to a plurality of locations on a material. The method also includes adjusting a dwell time of the printing beam at the one or more location so as to form a spot at each location.

Another embodiment of the method includes providing a printing system for printing a code on a product which is adjacent to the printing system and which is moving in a direction relative to the printing system. The code is constructed from a plurality of pixels. The method also includes prioritizing the order in which the pixels are printed such that the pixels are printed in a direction which is opposite to the direction which the product moves.

Another embodiment of the method includes providing a printing system for printing a code on a product moving in a direction. The code is constructed from a plurality of pixels in a first data set indicating the positions of the pixels. The method also includes generating a corrected data set indicating the position that each pixel would occupy if each pixel were moved at the velocity of the product until the pixel was printed. The method further includes printing the code according to the corrected data set.

Yet another embodiment of the method includes providing a printing system having a laser source for producing a printing beam and directing the printing beam so as to form a code on the material. The method also includes changing the amount of time required to form the code on the product.

Still another embodiment of the method includes providing a printing system for printing an alphanumeric code on a product moving in a direction, the code being constructed from a plurality of pixels. The method also includes printing pixels on the product in a two dimensional trace so as to form the code on the product.

The invention also relates to a printing system. The printing system includes a laser source for producing a printing beam and electronics for directing the printing beam to a plurality of locations on a material. The printing system also includes electronics for adjusting a dwell time of the printing beam at the one or more location so as to form a spot at each location.

Another embodiment of the system includes a laser configured to produce a printing beam for printing a code on a product. The laser is at most a 25 Watt laser. A housing includes a printing beam exit member through which the printing beam exits the housing. An optics assembly is positioned within the housing. The optics assembly focussing the printing beam on a product which is adjacent to the housing.

A further embodiment of the system includes a laser for printing a code on a product moving in a direction. The code is constructed from a plurality of pixels in a first data set which indicates the positions of the pixels. The system also includes electronics for generating a corrected data set which indicates the position that each pixel would occupy if each pixel were moved at the velocity of the product until the pixel was printed. The system also includes electronics for printing the code according to the corrected data set.

Yet another embodiment of the system includes a laser for printing a code on a product which is adjacent to the printing system and moving in a direction relative to the printing system. The code is constructed from a plurality of pixels. The system also includes electronics for prioritizing the order in which the pixels are printed such that the pixels are printed in a direction which is opposite to the direction which the product moves.

Another embodiment of the system includes a laser source for producing a printing beam and electronics for directing the printing beam so as to form a code on the material. The system also includes electronics for changing the amount of time required to form the code on the product.

Still another embodiment of the system includes a laser for printing an alphanumeric code on a product that is adjacent to the printing system and moving in a direction relative to the printing system. The code is constructed from a plurality of pixels. The system also includes electronics for printing pixels on the product so as to form the code on the product, the pixels being printed in a two dimensional trace.

BRIEF DESCRIPTION OF THE DRAWINGS

FIG. 3B is a sideview of a printing system used in conjunction with a product line which continuously moves the product in front of the printing system.

FIG. 3C is a topview of a printing system used in conjunction with a product line which continuously moves the product in front of the printing system.

FIG. 5A is a sideview of a printing beam being incident on a material at a location where a spot is to be formed on the material.

FIG. 5B is a perspective view of a printing beam being incident on a material at a location where a spot is to be formed on the material.

FIG. 5C is a sideview of a material after the printing beam has formed a spot in the material.

FIG. 5D is a perspective view of a material after the printing beam has formed a spot in the material.

FIG. 9A illustrates conversion of a code to a corrected code. The correct code is an image of the code which illustrates where the pixels of the code should be printed on a moving product in order for the code to appear as the uncorrected code.

FIG. 9B illustrates the code being converted to a corrected code.

FIG. 9C illustrates the corrected code.

FIG. 9D illustrates the code formed on the product after the corrected code is printed on the product while the product is continuously moved past the printing system.

DETAILED DESCRIPTION OF THE PREFERRED EMBODIMENT

Figure 1A:
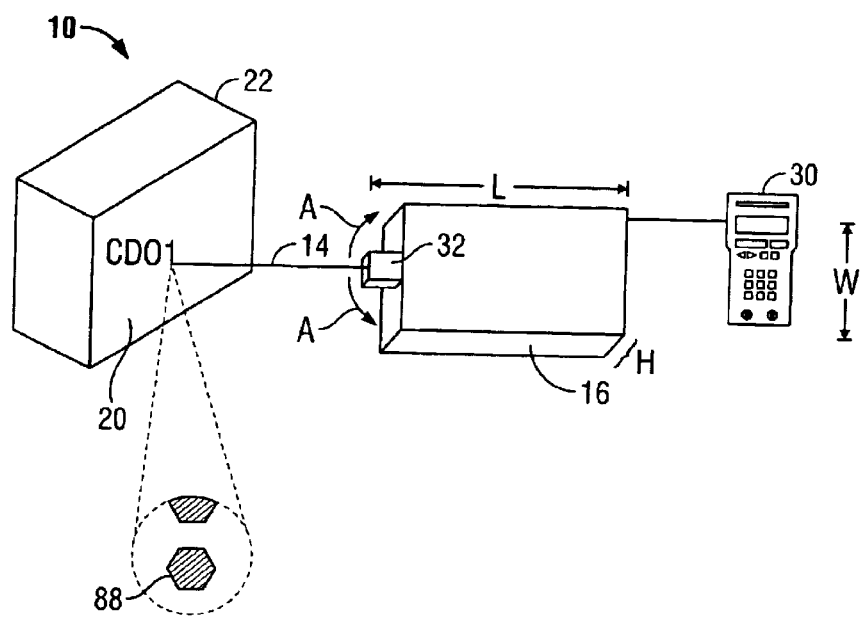
FIG. 1A is a sideview of a printing system according to the present invention.

The invention relates to a printing system for printing a code on a product positioned adjacent to the printing system. The printing system includes a laser for producing a printing beam and an optics assembly for steering the printing beam from one location to another location on the product. The printing system includes electronics for adjusting the time that the printing beam dwells at each location. This dwell time is adjusted such that the printing beam causes a spot to be formed at each location.

The locations can be arranged such that the spots form a pixel on the product. The pixels in turn can be arranged to form the symbols of a code. The symbols of the code can be the symbols which are available in word processing programs such as alphanumeric symbols and any other symbols used to identify a product batch, date, etc. The code can be readable text such as a product names or identifiers. The code need not be alphanumeric and can include symbols which are not produced by typical word processing programs. For instance, the code can be a bar code.

The products for use with the printing system can be products to be sold retail or packaging of retail products. Further, the products can be products which are sold to other businesses. Examples of products include pharmaceuticals, pharmaceutical packaging, food packaging, cosmetics, food such as eggs, dairy products, ice cream, computer components, automotive components, medical devices, detergents and beverages such as soft drinks and wines.

The code can be formed in multiple locations on a product. For instance, plastic medicine bottles can have one code printed directly on the plastic bottle and another code formed on the label attached to the plastic bottle.

As described above, the code is constructed from a plurality of spots. The spot is formed on the product by altering an optical characteristic of the material at the location where the printing beam is incident on the product. The printing beam can alter a variety of optical characteristics of a product. For instance, the printing beam can cause one or more layers of material to be ablated so the underlying layers are visible. Since upper layers of a material often have an ink layer on paper, removal of the ink layer leaves a spot where the paper is visible against the surrounding ink layer. The refractive characteristics of a material can also be altered. For instance, the printing beam can be used to print a code on a plastic such as a soft drink bottle. The printing beam alters the refractive characteristics of the plastic. The code is easily visible since the eye can pick up the sections having contrasting refractive properties. Additionally, the printing beam can etch certain materials.

Since the printing system employs a laser in order to print on the product, there is no need for consumables such as inks and solvents. Accordingly, the printing system can reduce the costs and complexity associated with printing a code on a product.

Traditional printing systems which employ a laser for printing a code on a product typically employ high powered lasers which often require liquid cooling and large amounts of space. However, in a printing system according to the present invention, the time that the laser dwells at each location can be increased to compensate for reductions in the power of the laser. As a result, a low powered laser can be employed in the printing system. For instance, in one embodiment, the laser is a $CO_2$ air cooled laser. In some instances the laser is at most a 25 Watt laser, in other instances the laser is at most a 20 Watt laser, in other instances the laser is at most a 15 Watt laser and in still other instances the laser is at most a 13 Watt laser.

Because the laser can be a low power laser, the laser, optics assembly and associated electronics can be mounted in a housing having a size on the order of an ink jet printer. As a result, the ability to adjust the dwell time means that the printing system according to the present overcomes the size and space challenges associated with traditional printing systems which employ a laser. Hence, the printing system according to the present invention is an ideal substitute for the ink jets used to print codes on products.

The printing system according to the present invention is ideal for printing on products that are moving such as the products in a production line. Because these products are moving relative to the system, there is a limited amount of time available for printing on each product. The printing system according to the present invention includes electronics for varying the amount of time required to print the code on the product. For instance, the printing system according to the present invention includes electronics for changing the density of pixels that define the code. Codes having a reduced pixel density can be printed more quickly than codes with an increased pixel density. Further, the printing system according to the present invention includes electronics for changing the size of the pixels that define the code. Smaller pixels require less printing time. Additionally, the dwell time of the printing system can be changed as noted above. The ability to change the time required to print a code allows the printing system to be used in conjunction with an increased number of production lines.

Figure 1B:
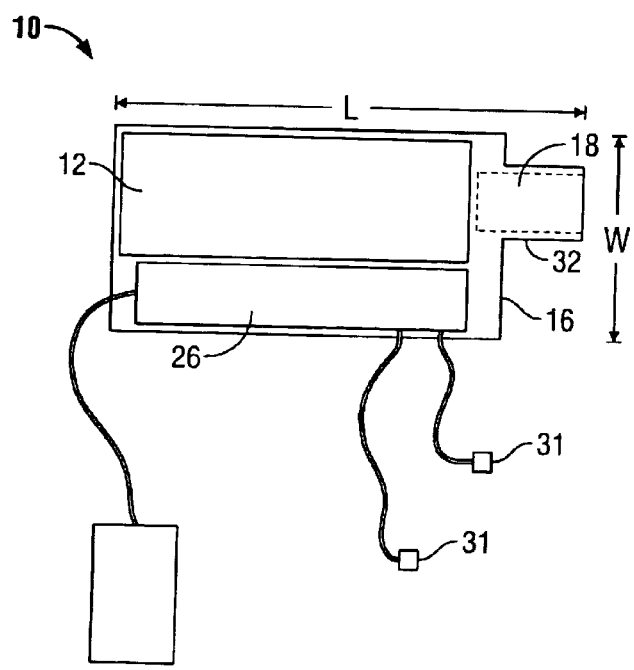
FIG. 1B is a cross section of the printing system looking down on to the printing system.

FIGS. 1A and 1B illustrate a printing system 10 for printing on a product positioned adjacent to the printing system. FIG. 1A is a sideview of the printing system 10 while FIG. 1B is a cross sectional top view of the apparatus. The printing system 10 includes a laser 12 for producing a printing beam 14. Any laser 12 can be used in the printing system. However, because the dwell time can be increased in order to compensate for the reduced laser power, a low powered laser can be employed in the printing system. For instance, the laser can be a $CO_2$ air cooled laser. In some instances the laser is at most a 25 Watt laser, in other instances the laser is at most a 20 Watt laser, in other instances the laser is at most a 15 Watt laser and in still other instances the laser is at most a 13 Watt laser.

The printing beam 14 from the energy source passes through an optics assembly 18 and is incident on a material 20 such as the material 20 used in product 22 packaging. As will be described in more detail below, the time that the beam is incident on the material 20 can be adjusted such that the beam causes a spot to be formed on the material 20.

The optics assembly 18 includes components for altering the direction of the printing beam 14. These components can be controlled to steer the printing beam 14 from one location to another location so as to create a spot at each of the locations. As will be described in more detail below, the spots can be arranged to form one or more pixels 88 on the material 20. Additionally, these pixels 88 can be arranged to form one or more symbols on the material 20. These symbols can be an alphanumeric code such as the code printed on a product 22 or on the label a product 22.

The printing system 10 also includes electronics 26 in communication with the energy source and the optics assembly 18. The electronics 26 can includes one or more processors for providing the functionality to the printing system 10. Suitable processors include, but are not limited to, microprocessors, digital signal processors (DSP), integrated circuits, application specific integrated circuits (ASICs), logic gate arrays and switching arrays. The electronics 26 can also include one or more memories for storing instructions to be carried out by the one or more processors and/or for storing data developed during operation of the printing system 10. Suitable memories include, but are not limited to, RAM and electronic read-only memories (e.g., ROM, EPROM, or EEPROM).

The electronics 26 control the operation of the laser 12 and the optics assembly 18. For instance, the electronics 26 can control the optics assembly 18 so as to adjust the direction of the printing beam 14, the length of time that the printing beam 14 dwells at a location on the material 20 where a spot is to be formed, the speed that the printing beam 14 moves between each location where the beam dwells, the size of pixels 88 used to create visually recognizable symbols, the selection of symbols created, etc.

The electronics 26 can optionally be in communication with a user interface 30. The user interface 30 can be remote from the housing 16, attached to the housing 16 and/or detachable from the housing 16. A suitable user interface 30 can include an alphanumeric keyboard and a display. The user interface 30 can be used to program the electronics 26 and/or set printing parameters. For instance, the user interface 30 can be used to manually control the time that the printing beam 14 dwells at a single location on the material 20, the size of the pixels 88 used to form a visually observable symbol, the type and/sequence of symbol which are formed, etc. The user interface 30 can also be used to manually activate the printing system 10. For instance, the user interface 30 can include a print key which causes the printing system 10 to print on the material 20.

The electronics 26 can also be in communication with one or more sensors 31. These sensors can provide the electronics with information about the products on which the printing system is to print. For instance, the sensors 31 can indicate the location of a product relative to the printing system, the direction that a product is moving and when a moving product has been stopped and when a product is in the correct position to be printed upon. Suitable sensors 31 include, but are not limited to, a speed sensor for detecting the speed and/or direction that a product is moving, a location sensor for indicating when a product is positioned in front of the sensor 31.

The printing system 10 includes a printing beam exit member 32 through which the printing beam 14 exits the housing 16. The printing beam exit member 32 can be as simple as an opening in the housing 16 or an immobile window mounted in the housing 16. In another embodiment, the printing beam exit member 32 can be moved relative to the housing 16 as illustrated by the arrow labeled A. In this embodiment, the printing beam 14 can be manually aimed toward a particular position on the material 20 by manipulating the printing beam exit member 32.

Because the laser can be a low power laser, the housing can also be compact. For instance, the housing can have a volume of less than 1200 cubic inches. In some instances, the housing has a volume less than 900 cubic inches and in other instances, the housing has a volume less than 1200 inches. In one embodiment, the housing has a length, L, less than 25 inches, a width, W, less than 10 inches and a height, H, less than 5 inches. In another embodiment, the housing has a length, L, less than 23.5 inches, a width, W, less than 7.5 inches and a height, H, less than 4 inches. For purposes of these dimensions, the housing includes the print beam exit member.

The small size is also associated with a low weight. For instances, in one embodiment, the housing and the enclosed components weighs less than 30 pounds. In some instances, the housing and the enclosed components weigh less than 25 pounds and in other instances, the housing and the enclosed components weigh less than 22 pounds. This weight does not include the weight of components which are remote from the housing. For instance, this weight does not include user interfaces which are not integral to the housing. Additionally, this weight does not include the weight of any sensors with which the printing system is in communication but which are not integral with the housing.

Figure 2:
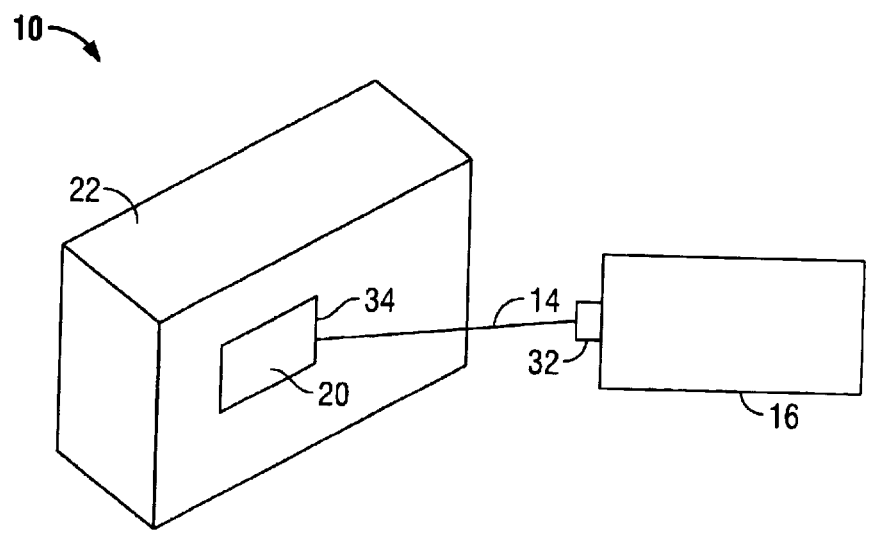
FIG. 2 illustrates the printing system forming a print zone upon a product.

FIG. 2 illustrates another embodiment of the printing system 10. The printing system 10 can include components for defining a print zone 34 on the material 20. For instance, the printing system 10 can project a rectangle onto the material 20 as illustrated in FIG. 2. The printing system 10 forms the symbol of the code within the print zone 34.

During operation of the printing system 10 the print zone 34 is formed on the material 20 and the operator adjusts the beam outlet member so that the print zone 34 appears at the desired location on the material 20. The user interface 30 is then used to activate print within the print zone 34. As a result, the operator of the printing system 10 can select where the printing mechanism prints on the material 20 by ensuring that the print zone mark appears in the desired print location. Other suitable print zone 34 marks include, but are not limited to, marks at the four corners of a print zone 34, a mark positioned in the center of the print zone 34, and a dashed line around the print zone 34.

In one embodiment of the printing system 10, the electronics 26 control the size and geometry of the print zone 34. As a result, the electronics 26 can match the size and shape of the symbols to be printed on the material 20. For example, when an unusually large code is to be printed on the material 20, the electronics 26 can enlarge the print zone 34 so the code will be formed entirely within the print zone 34. As a result, an increase in the size of the code will not result in erroneous positioning of the code on the material 20.

Figure 3A:
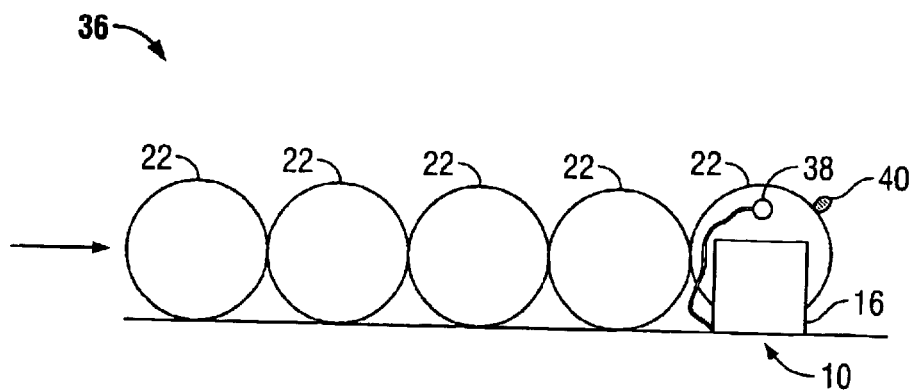
FIG. 3A is a sideview of a printing system used in conjunction with a product line which temporarily stops the product in front of the printing system.

The printing system 10 can print on a stationary product 22, however, the printing system 10 is configured to print on packaging located on a product line 36 which moves the product 22 relative to the printing system 10. FIG. 3A illustrates a printing system 10 in operation with a product line 36 which temporarily stops the product 22 in front of the printing system 10. The printing system 10 is in communication with a print trigger 38 which detects when one of the products 22 is positioned in front of the print trigger 38. A suitable print trigger 38 includes a device which produces a light beam. The device can be set up next to the product line 36 so that the product 22 disrupts the beam as the product 22 travels along the product line 36. The printing system 10 can monitor the device to determine when a product 22 has disrupted the beam. The print trigger 38 can be positioned such that when it has been triggered, the product 22 is correctly positioned for printing on the product 22. Alternatively, the print trigger 38 can be positioned such that when it has been triggered, a time delay must pass before the product 22 is correctly positioned for printing upon the product 22.

The printing system 10 is also in communication with a stop mechanism 40 which stops each product 22 in front of the printing system 10. During operation of the product line 36, the stop mechanism 40 is withdrawn to allow the products 22 to move along the product line 36. The movement can be the result of one or more mechanical forces or one or more natural forces such as gravity. Once the product 22 has moved past the stop mechanism 40 the stop mechanism 40 is moved back into place to block the next product 22.

During operation of the printing system 10 illustrated in FIG. 3A, the products 22 pass before the printing system 10 on the product line 36. The printing system 10 monitors the print trigger 38 to determine when a product 22 has moved in front of the print trigger 38. The printing system 10 waits a pre-set delay to let the product 22 be pressed against the stop mechanism 40 and then prints the symbols on the packaging. As a result, the product 22 remains stationary while the printing system 10 prints the code on the packaging.

Once the code has been printed, the printing system 10 activates the stop mechanism 40 so the product 22 is again able to move. The printing mechanism monitors the print trigger 38 to find a gap between products 22. Once a gap is found, the printing system 10 activates the stop mechanism 40 to stop the next product 22 and again monitors the print trigger 38 to detect when the next product 22 has moved in front of the print trigger 38.

FIGS. 3B and 3C illustrates the printing system 10 in use with a product line 36 which continuously moves the product 22 past the printing system 10. The products 22 can be evenly or sporadically spaced on the line. The printing system 10 is in communication with a print trigger 38 and a speed sensor 42. The electronics 26 is able to use signals from the speed sensor 42 to determine the speed and direction of the products 22 on the product line 36. Suitable speed sensors include, but are not limited to, encoders and resolvers.

While setting up the printing system 10, the distance between the printing system 10 and the print trigger 38 is administratively entered into the electronics 26. In an alternative embodiment, the print trigger 38 is attached to the housing 16 so as to provide a fixed and known distance between the print trigger 38 and the printing beam 14. In this embodiment, the distance is known to the electronics 26 and does not need to be administratively entered.

During operation of the system, the printing system 10 monitors the print trigger 38 to determine when a product 22 has moved in front of the print trigger 38. When it determines that a product 22 has moved in front of the print trigger 38, the printing system 10 determines the speed of the product 22 on the line and uses this speed to determine a code position time delay. The code position time delay is determined such that the code is printed at a desired position on the product 22. A suitable method for determining this code position time delay is discussed below. Once the determined code position time delay has passed, the symbols are printed as the product 22 moves past the printing system 10.

Once the code is printed, the print trigger 38 is monitored to determine when the product 22 has moved past the print trigger 38. Once the product 22 moves past the print trigger 38, the printing system 10 returns to monitoring the print trigger 38 to identify when a new product 22 has moved in front of the print trigger 38. As is evident from FIG. 3B, the print trigger 38 can be triggered by one product 22 while printing on another product 22. Hence, the printing system 10 must track the time delay for one of the products 22 while printing on the other product 22. These situations can be handled with standard multi-task programming.

The printing system 10 can be used with other product lines 36. For instance, some product lines 36 include a labeling station for applying a label to a product 22. The labeling stations typically include electronics 26 for determining when each product 22 has the label applied. The printing system 10 can be in communication with the labeling station and can print the code on each label after it has been applied to the product 22. The printing of the code can be triggered by the electronics 26 within the label station. For instance, when the electronics 26 of the label station detect that a label has been applied, these electronics 26 can provide the printing system 10 with a signal indicating that the code should be printed.

Figure 4A:
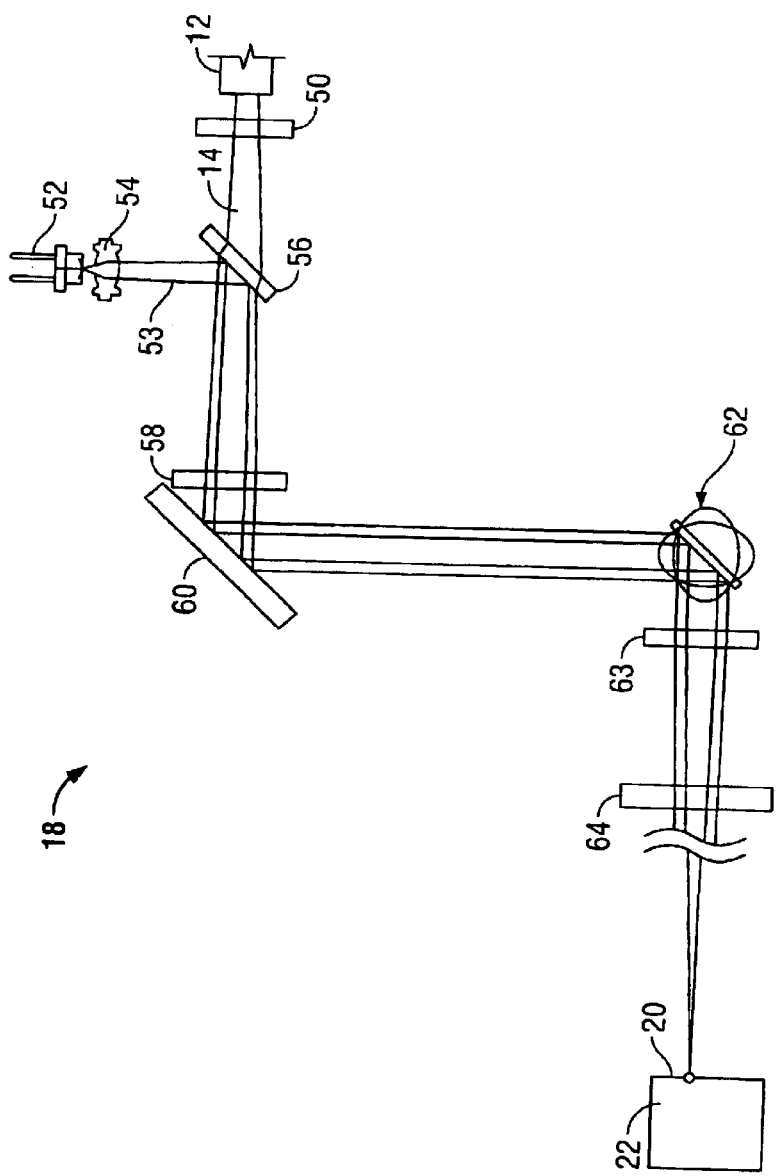
FIG. 4A illustrates an optical assembly for use in a printing apparatus according to the present invention.

FIG. 4A illustrates a topview of an embodiment of the optics assembly 18 for use in the printing system 10. The optics assembly 18 includes the laser 12 source for producing the printing beam 14 which passes through a first negative lens 50 which expands the printing beam 14. The optics assembly 18 also includes a print zone light source 52 for producing a print zone beam 53 which passes through a second negative lens 54 which expands the print zone beam. Although the printing beam 14 and the print zone beam are illustrated as being concurrently produced, the electronics 26 can cause them to be produced independent of one another. Further, the print zone beam is optional and need not be included in the optics assembly 18.

The printing beam 14 and the print zone beam are combined at a beam combiner 56. The combined beams pass through a positive lens 58 which collimates the beams before they are turned at a reflector 60. The combined beams then pass to a plurality of mirrors 62 which reflect the combined beams toward a second positive lens 63 which focuses the combined beams. The combined beams then pass through a protective window 64 before passing to the product 22.

Figure 4B:
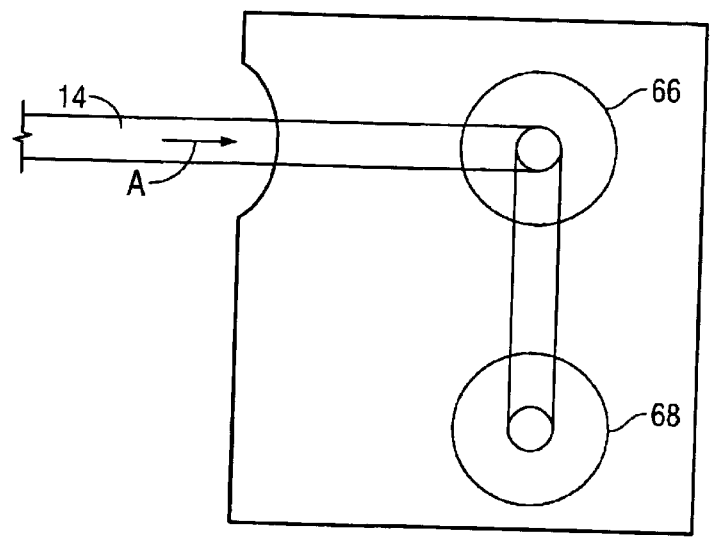
FIG. 4B is a sideview of a plurality of mirrors configured to steer a printing beam produced by the printing system from one location to another on a product where a code is to be formed.

Because FIG. 4A is a topview of the optics assembly 18 and the mirrors are positioned on top of one another, the arrangement of the mirrors is not apparent from FIG. 4A. In order to clarify the arrangement of the mirrors, FIG. 4B provides a sideview of the optics assembly 18 looking through the protective window. The combined beams approach the mirrors from the left as illustrated by the arrow labeled A. The beams are reflected off first mirror 66 down toward second mirror 68. The combined beams are reflected from the second mirror 68 out of the page.

Figure 4D:
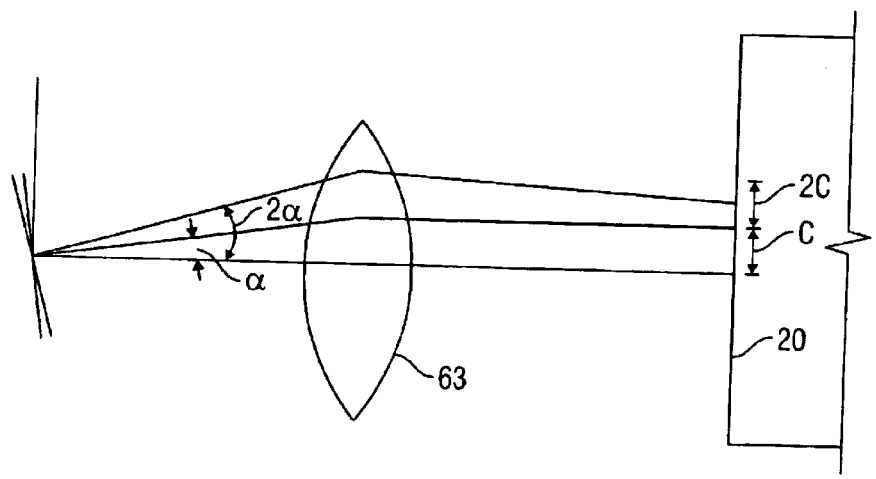
FIG. 4D illustrates the non-linear nature of a lens used in the optics assembly.
Figure 4C:
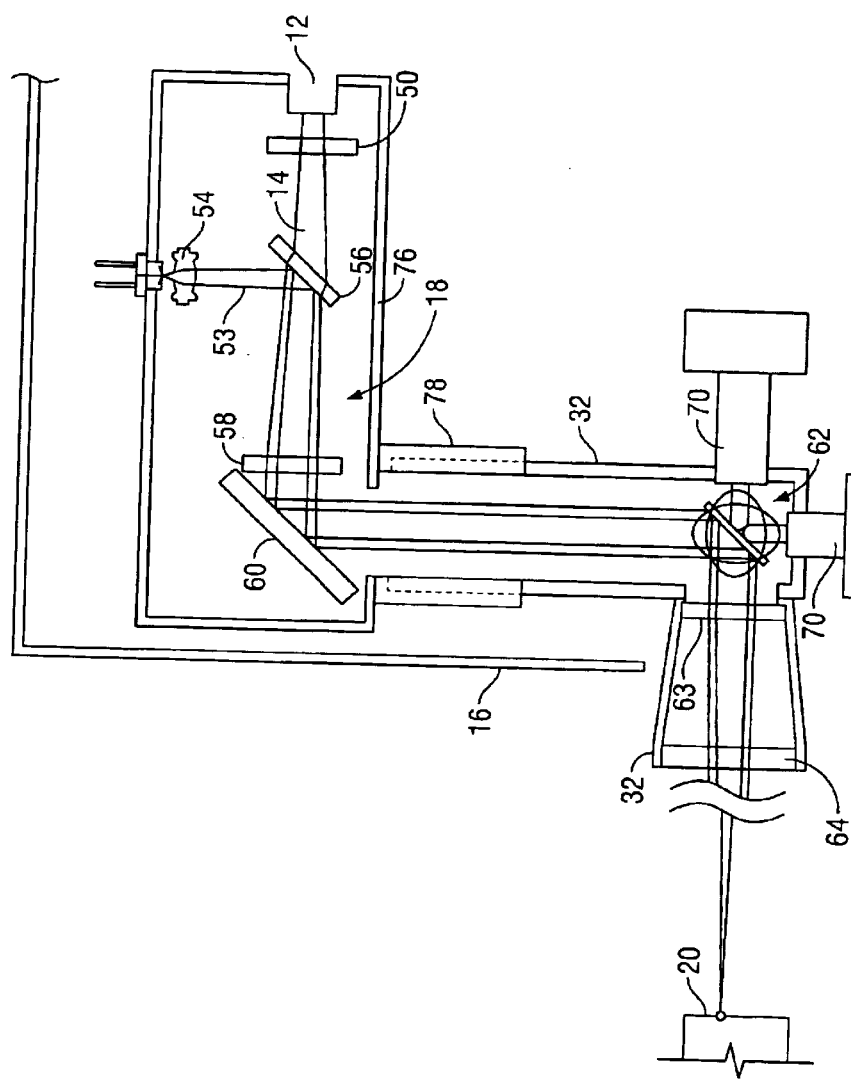
FIG. 4C illustrates the relationship between the optics assembly and the housing.

As illustrated in FIG. 4C, one or both of the mirrors can be coupled with a one or more actuators 70 for moving the mirrors. Suitable actuators 70 include, but are not limited to, micromotors. The actuators 70 are controlled by the electronics 26 which can use the actuators 70 to steer the print zone beam to form the print zone 34 on the packaging. For instance, when the print zone 34 has a rectangular shape, the print zone beam can trace a rectangle around the print zone 34 at a speed which causes the rectangle to appear solid to the human eye or at about 100 cycles/second. The micrometers can also be used to steer the printing beam 14 to form the symbols on the packaging.

The second positive lens 63 can be a non-linear lens. FIG. 4D illustrates the second mirror 68 in a first position and a second position. In the first position, the angle between the printing beam 14 and a lens axis is $\alpha$, while in the second position this angle is doubled to $2\alpha$. Due to the non-linear nature of the lens, the printing beam 14 is incident on the product 22 at a distance, C, from the lens axis when the second mirror 68 in the first position. However, when the second mirror 68 is in the second position, the printing beam 14 is not incident on the product 22 at a distance, 2C, from the lens axis despite the angle being increased to $2\alpha$. The lack of proportionality between the movement of the mirror and the movement of the printing beam 14 results from the non-linear nature of the lens.

The electronics 26 can include logic which corrects for the effects of non-linearity of the second positive lens 63. Accordingly, this logic would cause the second mirror 68 to increase the angle by more than $2\alpha$ in order to move the printing beam 14 by 2C. The correction logic can be developed from theoretical optical equations providing a relationship between $\alpha$ and C for the second positive lens 63. Alternatively, the correction logic can be developed from experiments performed to determine the relationship between $\alpha$ and C. This correction logic eliminates the need for an expensive and large F-$\theta$ lens which is typically used to correct for non-linearity. Accordingly, this correction allows the size and cost of the printing system 10 to be reduced.

The effects of spherical aberration can be corrected with the variable dwell time. For instance, the dwell time is increased when the effects of aberration are apparent on the product 22.

During operation of an optics assembly 18 including a printing zone light source 52, the print zone light source 52 is activated and the laser 14 is deactivated. The mirrors are moved such that the print zone 34 is formed on the product 22. When the symbols are to be formed on the packaging, the print zone light source 52 is disengaged and the energy source engaged until the symbols are formed. Once the symbols are formed, the energy source can be disengaged and the print zone light source 52 engaged in order to continue with formation of the print zone 34.

Figure 4E:
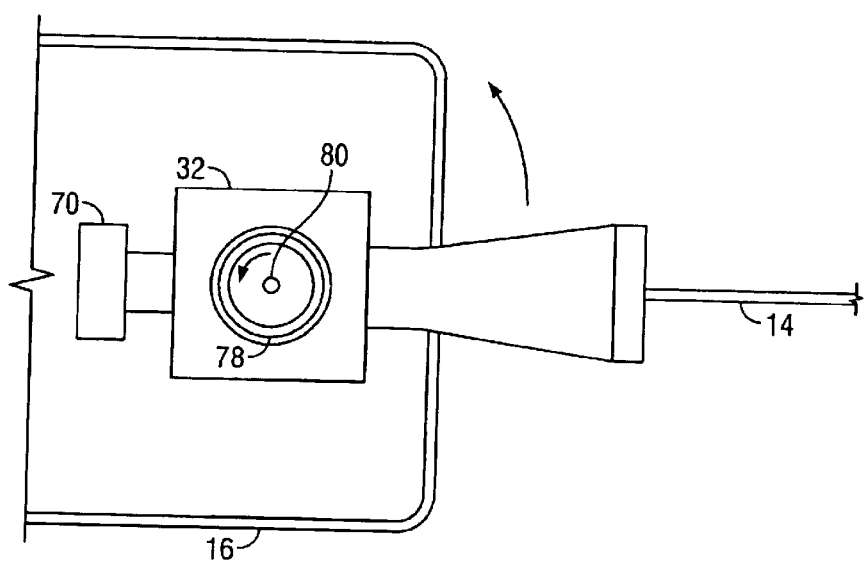
FIG. 4E illustrates a bearing which allows a printing beam exit member of the printing system to be rotated relative to a housing of the printing system. The rotatability of the printing beam exit member relative to the housing allowing a printing beam transmitted through the printing beam exit member to be aimed at a desired position on a product.

As discussed above, the printing system 10 can include a printing beam exit member 32 which can be moved relative to the apparatus housing 16. FIGS. 4C and 4E illustrate the mechanical arrangement which permits this movement of the printing beam exit member 32. A frame 76 supports the printing beam exit member 32 within the housing 16. A bearing 78 positioned between the frame 76 and the printing beam exit member 32 allows the printing beam exit member 32 to move relative to the frame 76. FIG. 4E provides a sideview of the bearing 78 looking along the printing beam 14. The printing beam 14 passes through the bearing 78 along the axis of rotation 80 permitted by the bearing 78. Hence, movement of the printing beam exit member 32 relative to the frame 76 does not change the position of the printing beam 14 relative to the bearing 78.

As illustrated in FIGS. 4C and 4E, the first mirror 66, the second mirror 68 and the actuators 70 are coupled with the printing beam exit member 32. As a result, the first mirror 66, the second mirror 68 and the actuators 70 move with the printing beam exit member 32 as the printing beam exit member 32 is moved relative to the housing 16. Further, a portion of the first mirror 66 is positioned along the bearing's axis of rotation 80. Hence, movement of the printing beam exit member 32 does not alter the angle of incidence between the printing beam 14 and the first mirror 66. Accordingly, the first mirror 66 directs the printing beam 14 toward the same portion of the second mirror 68 and the printing beam 14 exits the housing 16 through the same portion of the window when the printing beam exit member 32 is moved relative to the housing 16.

As described above, the printing beam forms a plurality of spots at a variety of locations on the product by remaining at the location until an optical characteristic of the location is altered. For illustrative purposes, FIGS. 5A–5D illustrate formation of a spot on a product 22 by removing a layer of ink from the product 22. FIGS. 5A and 5B illustrate the printing beam 14 incident on the material 20 at a particular location before a spot 83 is formed on the material 20. The material 20 includes a substrate 82 such as paper. An ink layer 84 is formed on the substrate. The ink layer 84 can include several different ink types as well as several different colors as is apparent from the labels of many commercially available products 22. The material 20 illustrated in FIG. 5A includes an additional layer 86. The additional layer represents the one or more layers which are often present over the ink layer 84 on product 22 packaging. For instance, many materials 20, such as dog food bags, include a wax layer over the substrate 82 and ink layers 84.

FIGS. 5C–5D illustrate the material 20 after the spot 83 has been formed at the particular location on the material 20. The time that the printing beam 14 dwells at the particular location is adjusted such that the printing beam 14 has ablated the ink layer 84 and the additional layer from the material 20 without burning the substrate. As a result, the substrate 82 is seen at the particular location on the material 20. The time required to ablate an ink layer 84 is typically 100–500 $\mu$s.

The time required to form the spot 83 is often a function of the materials 20 in the layers. For instance, the additional layer can be a wax layer which protects the packaging and gives it an attractive appearance. Forming a spot 83 through such layers often requires more time than is required by the ink layer 84 alone.

The present invention includes adjusting the time that the printing beam dwells at a location such that a spot is formed at the location. In some instances the dwell time is greater than 50 $\mu$s, other instances greater than 100 $\mu$s and other instances greater than 200 $\mu$s. In still other instances dwell time is 50–50,000 $\mu$s, other instances 100–500 $\mu$s and still other instances 200–500 $\mu$s. In some instances, the diameter of the spot is less than 400 $\mu$m, other instances less than 250 $\mu$m and in still other instances less than 170 $\mu$m.

Figure 6A:
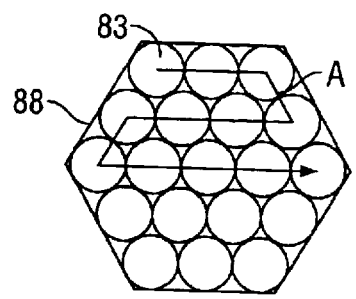
FIGS. 6A–6D illustrate formation of pixels having different sizes.

FIG. 6A illustrates a plurality of spots 83 arranged on the material 20 so as to define a pixel 88 on the material 20. Moving the printing beam 14 from one location to another location as illustrated by the arrow labeled A creates the pixel 88. A spot 83 is created at each location. The printing beam 14 is preferably incident on the material 20 throughout the formation of the pixel 88. The printing beam 14 is preferably moved from between locations where spots 83 are to be formed at a speed which prevents ablation of any of the layers on the material 20. This is possible due to the relatively low power of the laser 12. As a result, marks are not formed on the material 20 between the spots 83. Alternatively, the printing beam 14 can be moved from one location to another slow enough to provide some ablation between the spots 83. The additional ablation can help create the appearance of continuity between the spots 83.

Figure 6B:
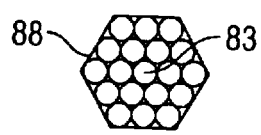
Figure 6C:
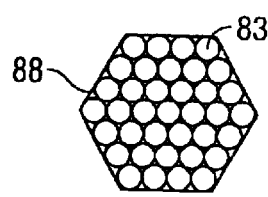
Figure 6D:
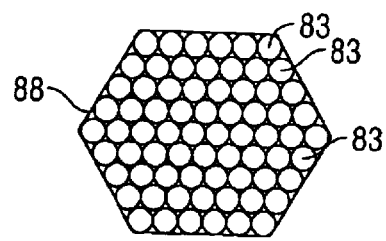

The size of the pixels 88 formed by the printing system 10 can be selected as illustrated in FIGS. 6B–6D. Increasing the number of spots 83 used to create the pixel 88 can increase the size of a pixel 88. For a given energy source power and spot 83 size, there is a tradeoff between the time needed to create a pixel 88 and the pixel 88 size. Hence, when an increased printing time is needed, the pixel 88 size can be reduced. Further, the pixels 88 illustrated above have a hexagonal shape, the spots 83 can be arranged in a pixel 88 having a shape other than hexagonal. For instance, the pixels 88 can be square, triangular, circular, etc. In one embodiment, the operator of the printing system 10 can use the user interface to select the size and shape of the pixel 88.

Figure 7A:
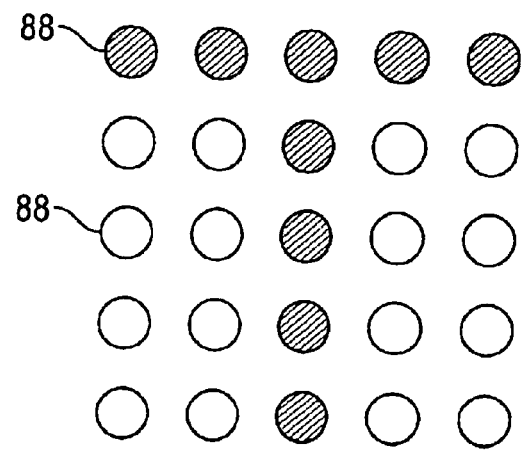
FIG. 7A illustrates an array of possible pixels which are selected to form a symbol within the array.
Figure 7B:
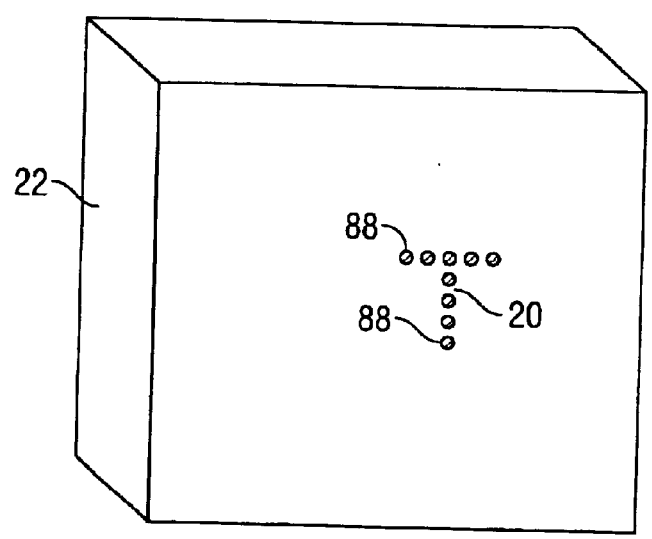
FIG. 7B illustrates the symbol of FIG. 7A printed on a product.

FIG. 7A illustrates an array of possible pixels 88 arranged in 5 columns and 5 rows. Symbols can be formed in the array by selecting certain of the possible pixels 88 to become a pixel 88 of a symbol while not selecting other of the pixels 88. For instance, a "T" is formed by selecting the possible pixels 88 which are darkened in FIG. 7A. The printing system 10 creates the symbol on the product 22 by directing the printing beam 14 so as to create pixels 88 on the product 22 in the pattern selected from among the possible pixels 88 in the array. Accordingly, the symbol appears on the product 22 as illustrated in FIG. 7B. The creation of symbols from a limited number of possible pixels 88 is well known as is illustrated by generation of characters on the LCD display of a calculator or traditional scoreboards.

Although the array of FIG. 7A is illustrated as having circular pixels 88, the array can include pixels 88 of different shapes such as squares. The distance between the pixels 88 can also be adjusted to increase or decrease the size of the code. In some instances, the distance between the pixels 88 is reduced to the point that the perimeter of one pixel 88 abuts the perimeter of another pixel 88. When the pixel 88 perimeters abut one another and the pixels 88 have a square shape the symbols of the code can have a solid and continuous appearance.

Although the illustrated array is a 5×5 array, other array dimensions are possible. For instance, 5×5, 7×5 and 16×10 are preferred array dimensions. Further, the array need not be arranged in rows and columns. Additionally, the possible pixels 88 in an array can overlap. Further some pixels 88 can have a different size than other pixels 88. Additionally, the array size can be changed to meet printing time requirements. For instance, when a code to be printed is so large that the system is not able to print the code on a moving product within the time that the product occupies a position in which the code can be printed, the array size is reduced in order to reduce the number of pixels that must be printed by the system. Because the system has to print fewer pixels, the time needed to print the code is reduced. Accordingly, an embodiment of the invention includes electronics for changing the pixel density in an alphanumeric code to be printed on a moving product.

The electronics 26 can include a database which associates each symbol with a particular pixel 88 pattern. As a result, the operator can enter a symbol or symbol sequence into the user interface 30 and the printing system 10 consults the database to determine the pixel 88 pattern associated with each symbol. The electronics 26 can use the pixel 88 pattern of each symbol to form a first data set which indicates the position of each pixel 88 in a code. For instance, each pixel 88 can be associated with a Cartesian coordinate which indicates where the pixels 88 are to be printed relative to one another. Other coordinate systems and methods can also be used to control the relative positioning of the pixels 88 in a symbol.

Because the laser 12 used is preferably a low power laser, the laser 12 can be moved between pixels 88 without making any marks on the material 20 between the pixels 88. Hence, the laser 12 can also be moved between the symbols without marking portions of material 20 between the symbols. As a result, there is no need to disrupt the printing beam 14 while moving the printing beam 14 between pixels 88 and/or symbols. Typical methods for disrupting the printing beam 14 include turning off the laser 12 or positioning an opaque object in the printing beam 14. The techniques require synchronizing the printing beam 14 disruption with both the motion of the printing beam 14 and any motion of the product 22. A printing system 10 according to the present invention is not associated with these difficulties.

Figure 8A:
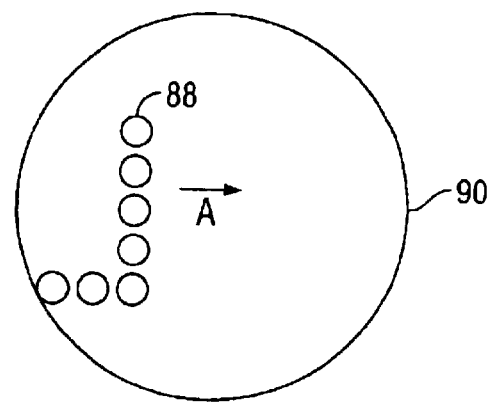
FIG. 8A illustrates an aperture through which limits the area within which the printing system is able to print.

In order to increase printing efficiency when printing on a moving product 22, the printing system 10 can employ a pixel 88 prioritization method. FIG. 8A illustrates this area within which the laser 12 can effectively print as an aperture 90. Although this aperture 90 can be a physical window, this aperture 90 is typically a result of the limitations of the optics assembly 18. For instance, the aperture 90 typically defines the area within which the optics assembly 18 will allow the printing system 10 to print without an undesirable loss of print quality. As the product 22 moves past the printing system 10, the printing system 10 prints the code through this aperture 90. The pixel 88 prioritization method according to the present invention increases the effective size of this aperture 90. Hence, the pixel 88 prioritization method allows the product 22 to be moved past the printing system 10 faster than what could be achieved without the pixel 88 prioritization method.

Figure 8B:
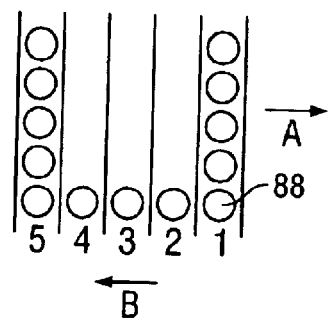
FIG. 8B illustrates a symbol to be printed on a product continuously moving in front of the printing system. The symbol includes a plurality of pixels arranged in columns. The order that the columns are printed is prioritized in a direction opposite of the direction which the product moves.

Pixel 88 prioritization determines the order that the pixels 88 will be formed on the product 22. The pixels 88 having higher priorities are printed before pixels 88 having lower priorities. The pixels 88 are prioritized such that the sequence that they are printed causes them to be printed in a direction opposite of the product's direction of motion. For instance, FIG. 8B illustrates a U shaped symbol formed in an array of pixels 88 having 5 columns and 5 rows. The U shaped symbol is to be printed on a product 22 moving in the direction of the arrow labeled A. However, the order of pixel 88 formation is prioritized in the direction illustrated by the arrow labeled B. Specifically, the pixels 88 in the column labeled 1 are printed first while the pixels 88 in the column labeled 5 are printed last.

FIG. 8A illustrates the U shaped symbol of FIG. 8B as it is being printed. Since the pixels 88 are printed in a direction which is opposite to the direction of motion, the portion of the product 22 where the remainder of the symbol is to be printed has not yet entered the aperture 90. As a result, there is still time available for printing the pixels 88 remaining in the symbol. However, if the pixels 88 were prioritized in the opposite direction, the portion of the product 22, the pixels 88 to be printed last might pass out of the aperture 90 before the printing system 10 has the opportunity to print them. Hence, the product 22 would need to be moved more slowly in order to be able to print the symbols. As a result, prioritizing the pixel 88 formation in a direction opposite to the product's direction of motion allows the product 22 to be moved past the printing system 10 at an increased rate of speed.

Figure 8C:
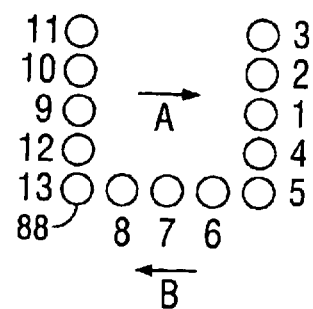
FIG. 8C illustrates a symbol to be printed on a product continuously moving in front of the printing system. The symbol includes a plurality of pixels. The order that each pixel is printed is prioritized.

FIG. 8B illustrates the pixels 88 being prioritized by column in that there is no particular print priority assigned to the pixels 88 within a column. However, the pixels 88 can be individually prioritized as shown in FIG. 8C. In some instance, the pixels 88 in one more columns are prioritized such that the pixels 88 which would enter the aperture 90 first if they were already present on product 22 are given the highest priority. For instance, if the U shaped symbol of FIG. 8C is on a product 22 traveling in the direction illustrated by the arrow labeled A, the pixel 88 labeled 1 will be the first pixel 88 to enter the aperture 90. Accordingly, this pixel 88 is provided the highest print priority in column 1.

Although the above discussion relates primarily to the prioritization of pixels 88, the prioritization can be at the level of the spots 83 which form the pixels 88. For instance, the spots 83 can be given a priority so they are printed in a direction opposite to the product's direction of motion. Additionally, the spots 83 can be prioritized based upon the order that the spots 83 would enter the aperture if the spots 83 were already printed on the product 22.

In order to print on a moving product 22, the printing system 10 converts the first data set to a corrected data set. The printing system 10 then prints the code using the corrected data set and treating the product 22 as if it were stationary relative to the printing system 10. FIGS. 9A–9D illustrates the formation and use of the corrected data set. The corrected data set is generated using the product 22 speed and direction generated using a speed sensor 42 and the average time required to form a pixel 88. The corrected data set is also generated using a pixel 88 printing order. The pixel 88 printing order can be generated according to the pixel 88 priority scheme discussed above or according any other scheme for determination of pixel 88 printing order. The position of each pixel 88 in the corrected data set, $P_n$, is determined by presuming that the pixel 88 in the original symbol moves with the velocity of the product 22 until the pixel 88 is formed as indicated by the vectors illustrated in FIG. 9B.

The position of each pixel 88 in the corrected data set, $P_n$, can be expressed in a number of coordinate systems including Cartesian coordinates. $P_n$ can be determined according to equation 1 where n is the $$P_n = P_{n,o} + (n-1)(t)v \qquad (1)$$

priority assigned to a pixel 88, $P_{n,o}$ is the original position of pixel 88 n, t is the approximate time required to form a pixel 88 and v is the velocity vector constructed from the speed and direction of the product's movement.

An embodiment of the corrected data set is illustrated in FIG. 9C. It includes only the corrected pixels 88 illustrated in FIG. 9B. The printing system 10 prints the code using the pixel 88 positions specified in the corrected data set as if the product 22 were stationary relative to the printing system 10. Hence, the printing beam 14 is held stationary relative to the printing system 10 as each spot 83 of the pixel 88 is formed. However, the motion of the product 22 causes the code set to visually appear as the original code as shown in FIG. 9D. Although the above symbol correction discussion is limited to the formation of a single symbol, each of the symbols in a code is corrected before printing.

Figure 10B:
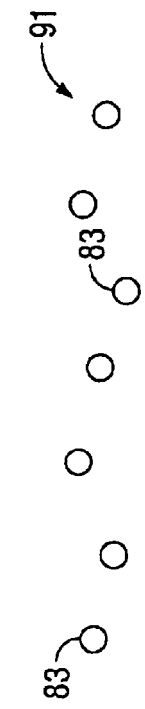
FIG. 10B illustrates the corrected pixel.
Figure 10E:
FIG. 10E illustrates the spot of FIG. 10D formed on a product as the product is moving.
Figure 10D:
FIG. 10D illustrates a spot formed on a stationary product.
Figure 10A:
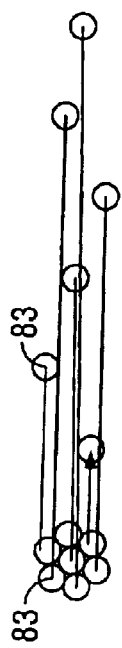
FIG. 10A illustrates conversion of a pixel to a corrected pixel. The correct pixel being an image of the pixel which illustrates where the spots of the pixel should be printed on a moving product in order for the pixel to appears as the uncorrected pixel.
Figure 10C:
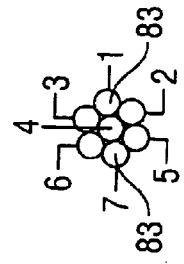
FIG. 10C illustrates the pixel formed on the product after the corrected pixel is printed on the product while the product is continuously moved past the printing system.

Although the above discussion regarding corrected data sets is limited to the pixel 88 level, in some instances the correction occurs at the spot 83 level. More specifically, corrected positions are determined for each spot 83 making up the pixels 88 of a symbol and the symbols are printed according to the corrected positions of the spots 83 as if the product 22 were stationary relative to the printing system 10. FIGS. 10A–10C illustrate a method of creating and using a corrected data set at the pixel 88 level. FIGS. 10A–10C are for a code including a single pixel 88 in order to simplify the illustrative process and the method can be easily extended to include images having multiple pixels 88.

The corrected data set is generated using the velocity of the product 22 generated using a speed sensor 42 and the average time required to form a spot 83 of the pixel 88. The corrected data set is also generated using a spot 83 printing order. The spot 83 printing order can be generated according to the spot 83 priority scheme discussed with respect to the pixel 88 prioritization scheme. However, the spot 83 printing order can also be generated using other schemes for determination of spot 83 printing order. The position of a spot 83 in the corrected data set, $S_m$, is determined by presuming that the spots 83 in the pixel 88 moves at the speed and direction of the product 22 until the spot 83 is formed as indicated by the vectors illustrated in FIG. 10A.

The position of each pixel 88 in the corrected data set, $S_m$, can be expressed in a number of coordinate systems including Cartesian coordinates. $S_m$ can be determined according to equation 2 where m is the $$S_m = S_{m,o} + (m-1)(t)v \qquad (2)$$

print order assigned to a pixel 88, $S_{m,o}$ is the original position of pixel 88 m, t' is the approximate time required to form a spot 83 and v is a velocity vector constructed from the speed and direction of the product's movement.

The corrected data set is illustrated in FIG. 10B. It includes only the corrected spots 83 illustrated in FIG. 10A. The printing system 10 prints the corrected data set as if the product 22 were stationary relative to the printing system 10. Hence, the printing beam 14 is held stationary relative to the printing system 10 as each spot 83 of the pixel 88 is formed. As a result, a spot 83 which would appear on a stationary product 22 as illustrated in FIG. 10D actually is actually "smeared" by the motion of the product 22 as illustrated in FIG. 10E. Due to the speed which the spots 83 forming the pixels 88 are generated on the product 22, the smear generally does not affect the appearance of the image. Hence, the motion of the product 22 causes the corrected data set to appear on the product 22 as the pixel 88 illustrated in FIG. 10C.

In order for the printing system to print according to the corrected data sets described above, the system must be able to print a two dimensional trace 91 of spots 83. Previous laser based systems for printing on a product have been limited to printing traces of spots or traces of pixels in a single dimension. Accordingly, an embodiment of the invention relates to forming a two dimensional trace 91 of spots or a two dimensional trace of pixels.

Figures 11A, 11B:
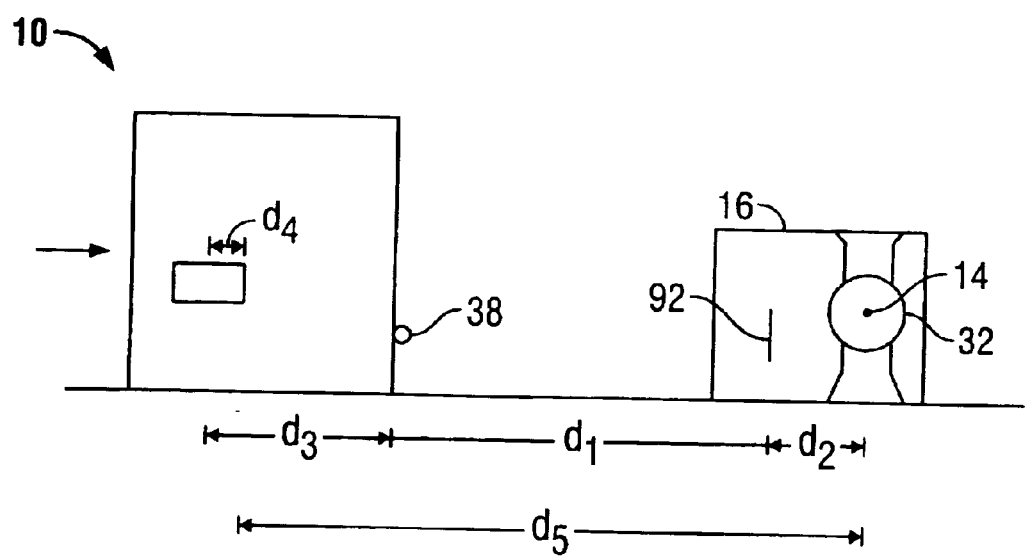
FIG. 11A illustrates the relationship between the product, the print trigger, the printing system and the print area.
FIG. 11B illustrates the leading edge of a print area.

In order for the printing system 10 to print the code at a specific position on the product 22 the printing system 10 must determine a code position delay. FIGS. 11A and 11B illustrate the relationship between the product 22, the print trigger 38 and the printing system 10. As described above, the distance between the print trigger 38 and the printing system 10 is entered during the set up of the printing system 10. This distance is illustrated as distance $d_1$ in FIG. 11A. This distance is measured relative to some a constant measuring point 92 such as a mark on the housing 16. Although the measuring point 92 is illustrated as a mark on the housing 16, the measuring point 92 can also be a physical characteristic of the printing system 10. For instance, the measuring point 92 can be one side of the housing 16.

The printing system 10 knows the distance between the measuring point 92 and the edge of the aperture which is closest to the print trigger 38. This distance is illustrated as distance $d_2$ in FIG. 11A. When a product 22 trips the print trigger 38 the distance between the edge of the aperture and the leading edge of the product 22 is $d_1+d_2$.

The operator of the printing system 10 administratively uses the user interface 30 to enter into the printing system 10 the distance from the front edge of the product 22 where he would like the center of the code to appear on the product 22. This distance is illustrated as $d_3$. The printing system 10 determines the length of the code from the pixel 88 positions specified in the first data set and divides this length in half. This distance is illustrated as $d_4$ in FIG. 11A. The printing system 10 determines the distance between the edge of the aperture and the leading edge of the print area, $d_5$, according to Equation 3.

$$d_5 = d_1 + d_2 + d_3 - d_4 \qquad (3)$$

During operation of the printing system 10, the printing system 10 divides $d_5$ by the speed of the product 22 to determine the code position time delay. When the print trigger 38 indicates that the leading edge of the product 22 has reached the print trigger 38, the printing system 10 waits for the code position time delay to pass before beginning to print the code.

Although the present invention has been described in detail, it should be understood that various changes, combinations, substitutions and alterations can be made hereto without departing from the spirit and scope of the invention as described by the appended claims.

What is claimed is:

1. A printing system, comprising:

a laser configured to produce a printing beam for printing a code on a product;

a housing including a printing beam exit member through which the printing beam exits the housing;

an optics assembly within the housing, the optics assembly focusing the printing beam on a product which is adjacent to the housing; and a bearing that couples the printing beam exit member with the housing, the printing beam exit member being movable relative to the housing, and the bearing having an axis of rotation, wherein the printing beam passes through the bearing along the axis of rotation.

2. The printing system of claim 1, further comprising:

a negative lens for expanding the printing beam and a positive lens for focusing the printing beam.

3. The printing system of claim 1, further comprising:

a collimating lens positioned between the negative lens and the positive lens.

4. The printing system of claim 1, further comprising:

electronics for correcting the non-linearity of one or more lenses through which the printing beam passes.

5. The printing of claim 1, further comprising:

a print zone light source for producing a print zone beam for defining a print zone within which the code is printed, the print zone beam exiting the housing through the printing beam exit member.

6. The printing system of claim 1, further comprising:
one or more mirrors for reflecting the printing beam in a desired direction.

7. The printing system of claim 6, wherein at least one of the one or more mirrors are connected to a motor configured to move the mirrors so as to control the direction that the printing beam is reflected.

8. The printing system of claim 7, further comprising:
electronics for controlling the motors so as to steer the printing beam from one location to another.

9. The printing system of claim 1, wherein the laser is an air cooled laser.

10. The printing system of claim 1, wherein the laser is at most a 20 Watt laser.

11. The printing system of claim 1, wherein the laser is at most a 15 Watt laser.

12. The printing system of claim 1, wherein the printing system weighs less than 25 pounds.

13. The printing system of claim 1, wherein the printing system weighs less than 22 pounds.

14. The printing system of claim 1, wherein the printing system includes a housing having a volume of less than 1200 cubic inches.

15. The printing system of claim 1, wherein the printing system includes a housing having a volume of less than 600 cubic inches.

* * * * *